April 9, 1940.  G. B. HOADLEY  2,196,809
TELEMETRIC SYSTEM
Filed March 17, 1936   3 Sheets-Sheet 1
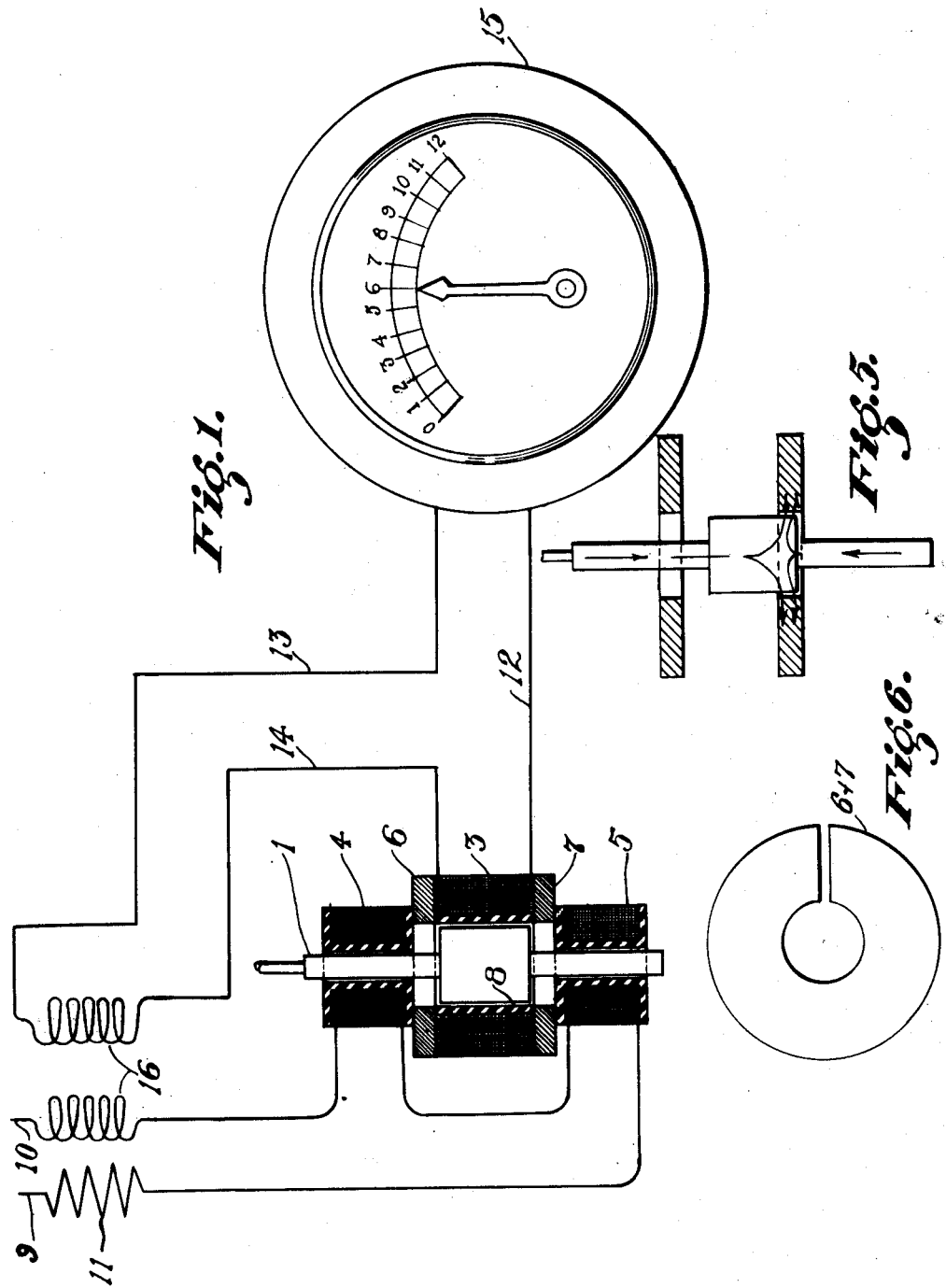
INVENTOR
George B. Hoadley

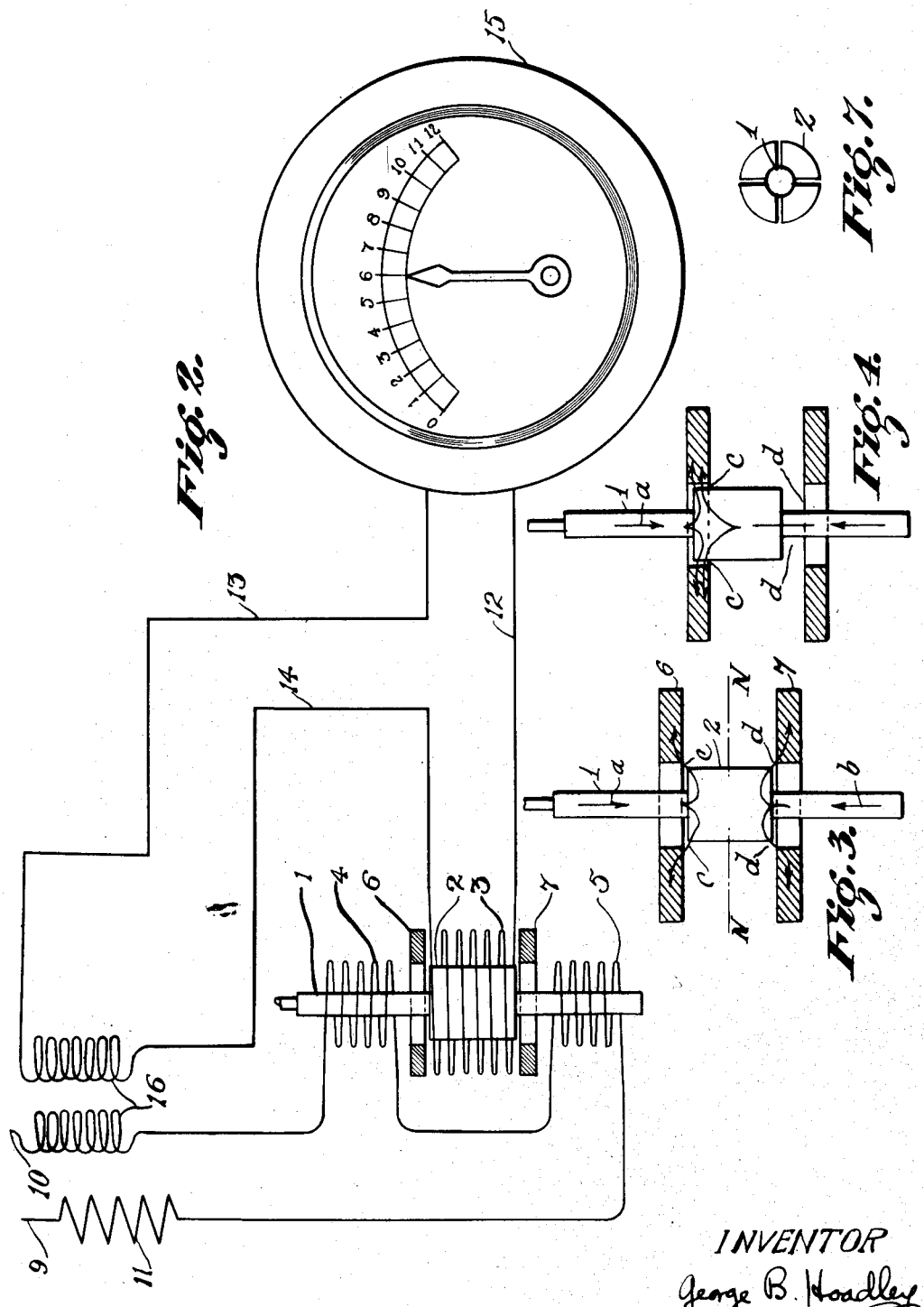

Patented Apr. 9, 1940

2,196,809

UNITED STATES PATENT OFFICE 2,196,809

TELEMETRIC SYSTEM

George B. Hoadley, Belmont, Mass., assignor to Philip A. Jerguson, West Medford, Mass.

Application March 17, 1936, Serial No. 69,259

4 Claims. (Cl. 177—351)

This invention relates to a system for the electrical transmission of intelligence at a distance. More specifically, it relates to telemetric systems.

Among other purposes the invention has for some of its objects to provide a novel system for transmitting intelligence at a distance, and to provide a novel form of transmitting instrument which will move the pointer of a commercial type of indicating or recording instrument the whole length of its scale for a comparatively small movement of the movable part of the transmitting instrument, and which will require only a comparatively small mechanical force to cause the movement of the movable part of the transmitting instrument.

A device of this character may be used for many different purposes. One of the purposes for which it was designed is to allow the readings of a liquid level indicator to be transmitted to an indicating device disposed at a distant point which would enable, for instance, an operator to ascertain the level of water in a tank from the readings of an instrument disposed in his room or in any other place where his presence may be required for the performance of his other duties. In this connection, the invention is especially well adapted for operation with a water level indicator of the type described in the application of Mr. Leon S. Chalatow, Serial No. 668,678, filed May 1, 1933, now Patent No. 2,040,357 of May 12, 1936, in which it is necessary that the element which actuates the moving member of the transmitting instrument have the smallest possible total displacement, and at the same time meet very little resistance from the transmitting instrument. Various other uses will be readily found and it is not intended to confine the present invention to any particular use.

I shall now proceed to describe what I consider to be the preferred form of the transmitting instrument and the electrical connections with the help of the drawings.

Figure 1 represents a section substantially through the center of the transmitting instrument, and its electrical connections to the power source and to the indicating or recording instrument.

Figure 2 is a wiring diagram of the device.

Figure 3 is a section substantially through the center of the transmitting instrument showing only those parts of the instrument which are made of magnetic material, and lines representing magnetic flux. In this figure, the movable element is shown in the center of its travel.

Figure 4 is substantially the same as Figure 3, except that the movable element is shown near one end of its travel.

Figure 5 is substantially the same as Figure 3, except that the movable element is shown near the opposite end of its travel.

Figure 6 shows a plan view of the magnetic spacer.

Figure 7 shows a plan view of the movable member.

Figure 8:
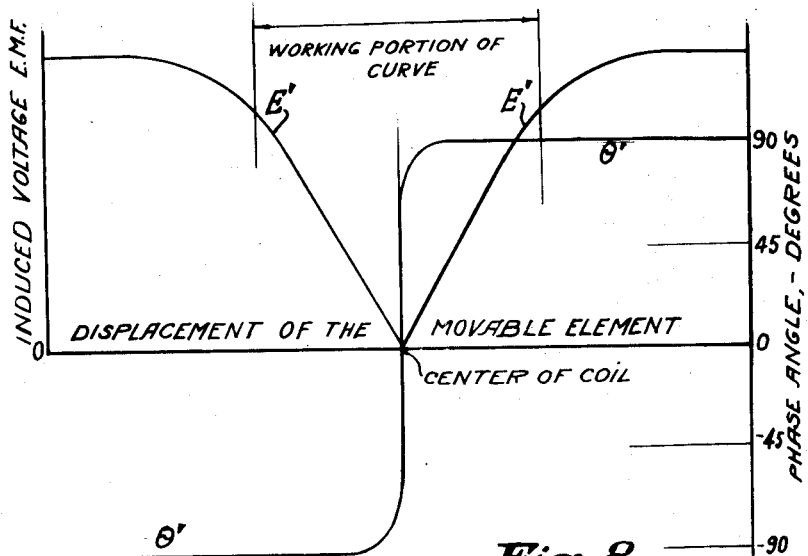
Figures 8, 9, 10 show some curves whose significance will become apparent later in the description.

Referring to the drawings, a rod 1 made of magnetic material with an enlargement 2 substantially in its center, is attached to a float or other object (not shown), whose position is to be indicated at a distance by the indicating instrument. A coil of insulated wire 3 surrounds the enlargement 2 of the plunger 1. Two other coils 4 and 5 surround the reduced sections of the rod 1; one coil 4 being on one side of coil 3 and the other coil 5, being on the other side of coil 3. A body of magnetic material 6 is located between coils 3 and 4 and a similar body 7 is located between coils 3 and 5. A cylinder of non-magnetic material 8 separates the two iron bodies 6 and 7 and also acts as a form on which to wind coil 3. The rod 1 and its enlargement 2 are not in physical contact with any of the rest of the transmitting device, and thus there is no mechanical friction between them.

The two coils 4 and 5 receive alternating current from a constant voltage source through wires 9 and 10. The resistor 11 serves as a means of controlling the amount of current which flows in these coils. The coils 4 and 5 are wound and connected in opposition, so that both of the magnetic fluxes set up by them in the rod 1 are at any instant directed either towards the enlargement 2 or away from the enlargement 2. Wires 12, 13, 14 connect the indicating instrument 15, the transformer 16 and the coil 3 as shown in Figures 1 and 2.

In Figure 3, there is shown a cross section of the magnetic circuit, with the movable element at the center of its travel. The flux set up by the coil 4 is represented by the arrow $a$ and the flux set up by the coil 5 is represented by the arrow $b$. In this particular form of the invention, there is symmetry about a horizontal plane N–N, so the fluxes $a$ and $b$ are equal. Since the air gaps $c$ and $d$ are similar, their magnetic reluctances are equal, so flux $a$ passes out along the magnetic member 6, while flux $b$ passes out along the magnetic member 7. The result is that there is no flux linking the coil 3, and consequently there will be no electromotive force induced in this coil.

Figure 4, is substantially the same as Figure 3, except that the movable member has been lifted to the top of its travel. The same situation as above prevails, with the exception that the magnetic reluctance of the air gap $d$ is much larger than is the magnetic reluctance of the air gap $c$. This is due to the enlargement 2 in the movable member. Consequently most of the flux $b$ passes out through member 6 which means that there is an alternating flux linking coil 3, and therefore there will be an alternating electromotive force induced in this coil, and this electromotive force will be a function of the position of the movable member. If the displacement as shown by Figure 5 is below the midpoint instead of above the mid-point, then there is a similar electromotive force induced which is 180 degrees out of phase with the electromotive force described. The enlarged portion 2 of the plunger 1 make it possible to obtain a rapid change in the size of air gap for comparatively short movements of the plunger.

In Figure 8 curve E' shows the magnitude of the induced electromotive force, and curve $\theta'$ shows the phase angle of the induced electromotive force, using the phase angle of the current in coils 4 and 5 as the reference.

A voltmeter, if connected directly to coil 3 would not differentiate between a displacement above and one below the center of travel of the movable member, because it measures magnitude, independently of phase. This means that if the plunger were in the center the voltmeter would read zero. Then if the plunger were moved up a certain amount, the voltmeter would move up-scale a certain amount. However, if the plunger were moved down below the center the same amount, the voltmeter would read again up-scale the same amount as before. In order to overcome this, I add to the electromotive force induced in the coil 3 the electromotive force induced in the secondary of the transformer 16, so that when the plunger is in the center, the voltmeter will also be in the center of its scale. When the plunger moves to one end of its travel the sum of the electromotive force produced in the transmitter by the position of the plunger and the electromotive force produced in the transformer will add to zero and bring the indicator to its zero position. When the plunger moves to the opposite end of its travel the sum of said electromotive forces will add so as to make the indicator move to its highest position.

Figure 9:
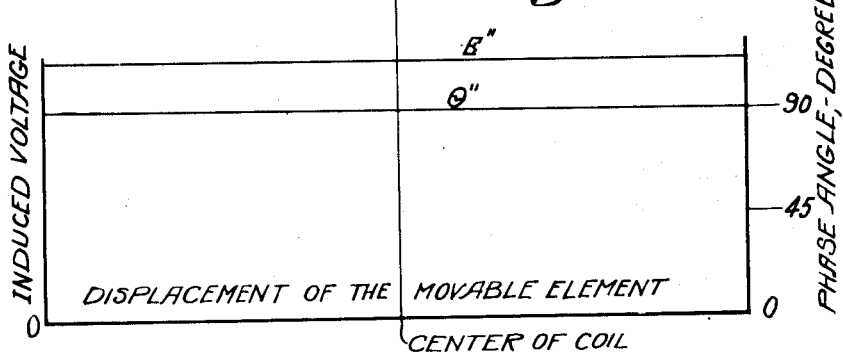

Figure 9 shows that both the magnitude E'' and the phase angle $\theta''$ of the electromotive force in the secondary of the transformer are independent of the position of the movable member of the transmitting instrument.

Figure 10:
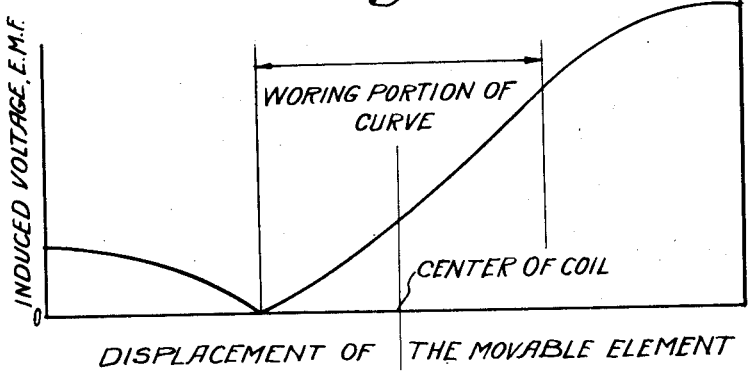

On the right hand side of the axis, the electromotive forces of the coil and transformer have the same phase, and so their sum is the addition of the two values E' and E''. This is shown in the right hand portion of Figure 10. On the left hand side of axis, the electromotive forces of the coil and transformer have opposite phases, and so their sum is the subtraction of the smaller from the larger of the values of E' and E''. This is shown in the left hand portion of Figure 10.

This total electromotive force is lead to the alternating current voltmeter 15 by the wires 12 and 13. The dial of this voltmeter could be so arranged as to give the indication of the position of the movable member of the transmitter.

In order to obtain curves of the type shown, especially insofar as the curves for $\theta'$ and E' are concerned, it is necessary that the power losses due to hysteresis and eddy currents in the iron parts of the device be small. The flux density is low, as explained later, and so the hysteresis loss will be small. Likewise, eddy currents will be small, except in the iron rings 6 and 7. Referring to Figure 4, ring 7 acts as a short circuited turn and carries a current which is large enough to seriously distort the flux. Likewise, in Figure 5, ring 6 acts as a short circuited turn. This action can be completely eliminated by cutting a slot in each ring as is shown in Figure 6 so that there is no longer a complete path in which current can flow.

The enlargement 2 in the center of the movable member can to a lesser degree act as a short circuited turn, and the remedy is the same, namely, to cut four slots in the enlargement, as is shown in Figure 7.

The principal resistance to the displacement of the movable member within the transmitting device is the magnetic force between the movable member and the two magnetic bodies 6 and 7. This force varies as the square of the flux density, so in order to keep the force low, the flux density should be kept small by using a small number of ampere turns in coils 4 and 5. This means that a comparatively low voltage will be induced in coil 3, which in turn means that the voltmeter 15 be a sensitive one, preferably of the rectifier type. However, this is not meant to indicate that this is the only type of voltmeter which can be used.

The above description refers to only one form of the device, and I will now proceed to discuss certain variations which might be made, depending upon the particular use to which this device is applied. It is not intended, however, that these variations include all of the forms of the device which embody the basis of the invention.

This device may be used where the supply voltage is not constant by using any one of the commercially available voltage regulators, or preferably by using some form of current regulator.

In certain applications, it may be possible to do away with the transformer 16. One way of doing this is to make coils 4 and 5 have unequal numbers of turns, the inequality being of just the correct amount to induce a constant electromotive force in coil 3 equal to E''. Another way to do this would be to use as an indicating device an instrument which would be sensitive to phase angle as well as to magnitude.

The whole transmitter may be placed within a box of magnetic material, to make a better return path for the magnetic flux, and also to shield the coils from the effects of external magnetic fields.

Another point where an improvement can be made is in the indicating instrument. Sometimes the scale of a commercial alternating current voltmeter is very crowded at the lower end. This may be overcome by arranging the system so that the total electromotive force developed by the transmitter and by the transformer together is not zero when the plunger is at the bottom of its travel. To compensate for this, the indicating instrument is adjusted to read zero, which means that if the indicating instrument were to be disconnected, its reading would be below zero. By this means, the crowded part of the voltmeter scale is placed below the region of the scale that is used.

Having thus described my invention what I claim as new is:

1. A transformer having two spaced primaries wound for magnetic opposition and an interposed secondary, an element having a magnetic permeability different from that of air adjacent one primary on the side towards said secondary, a second element similar to the first adjacent the other primary on the side towards said secondary, a member extending through the coils comprising a core having a magnetic permeability different from that of air coupling the secondary to both primaries and of a length axially of the coils substantially equal to the distance between the primaries and means responsive to a variable to change differentially the coupling of said secondary to said primary by means of said core.

2. A transformer having two spaced primaries wound for magnetic opposition and an interposed secondary, an element having a magnetic permeability different from that of air adjacent one primary on the side towards said secondary, a second element similar to the first adjacent the other primary on the side towards said secondary, a member extending through the coils comprising a core having a magnetic permeability different from that of air coupling the secondary to both primaries and of a length axially of the coils substantially equal to the distance between the primaries and means responsive to a variable to change differentially the coupling of said secondary to said primary by means of said core, a second transformer having a secondary in additive series with said first transformer and an electric scale instrument connected to be responsive to the combined induced voltages in said secondaries so that it will have a reference reading at an intermediate point of its scale, when the secondary of the first transformer is coupled equally to both primaries.

3. Apparatus for electrically transferring the positions of a moveable element comprising an alternating current source, two spaced primary coils, one secondary coil placed between the said primary coils, all three coils having their windings substantially coaxial, said primary coils being so wound and connected to said alternating current source that the magnetic fluxes are at any time either both toward the center or both away from the center of said secondary coil, a magnetic core for said transformer having a substantial enlargement at its center and of an extent less than the distance between said primary coils, a magnetic body placed between one of said primary coils and one end of the secondary coil, a second magnetic body placed between the other primary coil and the opposite end of the secondary coil, an additional transformer having its primary connected to said source and its secondary in series with the first said secondary, means to move said core in both directions responsive to a variable and an electric measuring instrument connected across said secondary.

4. Apparatus for electrically transferring the positions of a movable element comprising an alternating current source, two spaced primary coils, one secondary coil placed between the said primary coils, all three coils having their windings substantially coaxial, said primary coils being so wound and connected to said alternating current source that the magnetic fluxes are at any time either both toward the center or both away from the center of said secondary coil, a magnetic core for said transformer having a substantial enlargement at its center and of an extent less than the distance between said primary coils, a magnetic body placed between one of said primary coils and one end of the secondary coil, a second magnetic body placed between the other primary coil and the opposite end of the secondary coil, means to move said core in both directions responsive to a variable and an electric measuring instrument connected across said secondary.

GEORGE B. HOADLEY.